United States Patent [19]

Kim

[11] Patent Number: 5,356,285
[45] Date of Patent: Oct. 18, 1994

[54] FLAME SIZE CONTROL APPARATUS FOR A GAS BURNER

[75] Inventor: Byung Youb Kim, Kyungki-do, Rep. of Korea

[73] Assignee: Samsung Electronics Co., Ltd., Suwon City, Rep. of Korea

[21] Appl. No.: 12,409

[22] Filed: Feb. 3, 1993

[30] Foreign Application Priority Data

Feb. 20, 1992 [KR] Rep. of Korea ............... 92-2486[U]

[51] Int. Cl.⁵ .................. F24C 3/12; F16K 31/528; G05G 11/00
[52] U.S. Cl. .................. 431/18; 126/39 R; 251/77; 251/229; 251/251; 251/289; 251/319
[58] Field of Search ........... 137/637; 126/38, 39 R; 251/77, 205, 208, 209, 229, 251, 289, 319; 431/12, 18, 62

[56] References Cited

U.S. PATENT DOCUMENTS

| | | | |
|---|---|---|---|
| 1,230,590 | 6/1971 | Mason | 137/637 |
| 2,260,474 | 10/1941 | Mueller | 251/205 |
| 2,540,056 | 1/1951 | Robinson | 251/205 |
| 2,650,610 | 9/1953 | Brumbaugh | 137/637 |
| 2,650,612 | 9/1953 | Brumbaugh | 251/209 |
| 2,650,614 | 9/1953 | Brumbaugh | 251/209 |
| 2,980,140 | 4/1961 | McMillan | 137/637 |
| 3,001,547 | 9/1961 | Brumbaugh | 251/209 |
| 3,011,720 | 12/1961 | Ives | 251/77 |
| 3,348,577 | 10/1967 | Miller et al. | 137/637 |
| 4,779,643 | 10/1988 | Genbauffe | 251/209 |

FOREIGN PATENT DOCUMENTS 535023 2/1955 Belgium ............... 137/637
1-38411 11/1989 Japan.

Primary Examiner—George L. Walton
Attorney, Agent, or Firm—Burns, Doane, Swecker & Mathis

[57] ABSTRACT

A gas burner includes a single valve for adjusting the flame size. A plurality of push buttons is provided for adjusting that valve to respective positions of adjustment, so that the flame size depends upon which button is pushed.

10 Claims, 6 Drawing Sheets

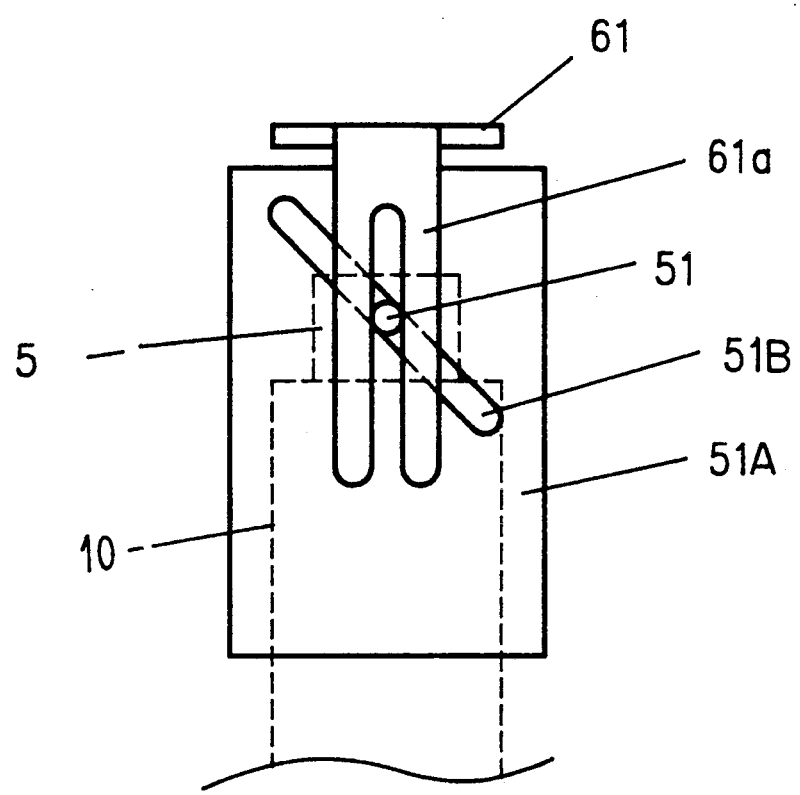

FLAME SIZE CONTROL APPARATUS FOR A GAS BURNER

BACKGROUND OF THE INVENTION

The present invention relates to a push button control device for adjusting the size of the flame in a gas range.

FIG. 1 illustrates a conventional control device for adjusting the size of the flame in a gas range. The control device comprises a gas supplying needle 5, a rod 51 mounted on the circular cylindrical wall of the needle 5 and a lever 13 which is connected at one end to one end of the rod. The other end of the lever 13 protrudes through an opening in the front wall of the unit and has a knob 13A for moving the lever 13 in a direction into or out of the plane of the paper when viewed in FIG. 1 in order to control the size of the flame.

However, a problem occurs because the operating direction of the lever 13 is not in the same operating direction as the ignition button 21 (i.e., button 21 moves to the left or right in FIG. 1) which is installed adjacent to the knob 13A, causing the operation of the lever 13 to be inconvenient.

Further, another problem occurs because the range of control of the flame size is not incremental and thus the flame size is adjusted manually by a sliding movement of the lever in accordance with the user's visual inspection of the flame size.

In order to resolve the problem, a flame size control device for use in a gas range has been developed and disclosed in Japanese Utility Model Publication No. 1-38411/1989.

The flame size control device for use in a gas range comprise a plurality of switch valves mounted in a gas channel in a parallel pattern for adjusting the supply gas by means of a close/open movement. A main valve is connected with the switch valves in a serial pattern for opening/closing the gas channel. The switch valves are operated in response to the position of a plurality of flame size adjusting switches shaped in the form of buttons. A button type ignition switch manipulates the main valve. The switch valve and main valve are closed by means of a button type extinguishing switch. Further, the switch valves comprise a high flame switch, a medium flame switch, a low flame switch and a steaming switch, whereby the size of the flame depends upon which of the switch valves is actuated. The control device comprises a coordinating mechanism which permits the steaming switch to be pushed only in conjunction with the operation of the low flame switch.

However, the above control device requires a plurality of switch valves and a plurality of flame size adjusting switches. That creates a complexity of components and the risk of a malfunction during the operation of the device.

SUMMARY OF THE INVENTION

The present invention seeks to provide a control device for flame size adjustment in a gas range which solves the above mentioned problems.

The object of the present invention is to provide a control device for adjusting the flame size which has a simple design with a minimum number of components.

Another object of the present invention is to provide a control device for flame size in which the direction of movement of the buttons for controlling the flame size is in the same direction as the buttons for igniting/extinguishing the flame.

According to one aspect of the present invention, there is provided a control device for adjusting the size of the flame in a gas range comprising:

- a needle placed in a gas passage for controlling the quantity of gas;
- a rotating lever connected to the needle to cause it to move to an upward or downward position; and
- a flame size control member for moving the rotating lever in either a clockwise or counterclockwise direction.

Preferably, the adjusting the flame size control member comprises a plurality of push buttons, the rear sides of which are connected respectively to a plurality of connecting bars, and a plurality of control plates interconnected with the connecting bar and the rotating lever.

Preferably, the control plates are placed one above the other and the rotating lever is rotated in either a clockwise or counterclockwise direction according to the respective configuration of the connected sliding portions.

In the flame size control device in a gas range, when one button is selectively pushed according to the desired size, the corresponding control plate is moved forward. The connected sliding portion of the control plate moves the control lever in either a clockwise or a counterclockwise direction. The movement of the control lever causes the needle placed in the gas supply passage to be moved either up or down. The quantity of gas is thus determined according to the size of the gap around the needle in the gas passage.

BRIEF DESCRIPTION OF THE DRAWINGS

The invention will now be explained, by way of example, with reference to the accompanying drawings in which:

FIG. 3C is a front view of a portion of the apparatus shown in FIG. 3B;

DETAILED DESCRIPTION OF THE PREFERRED EMBODIMENT

Figure 1:
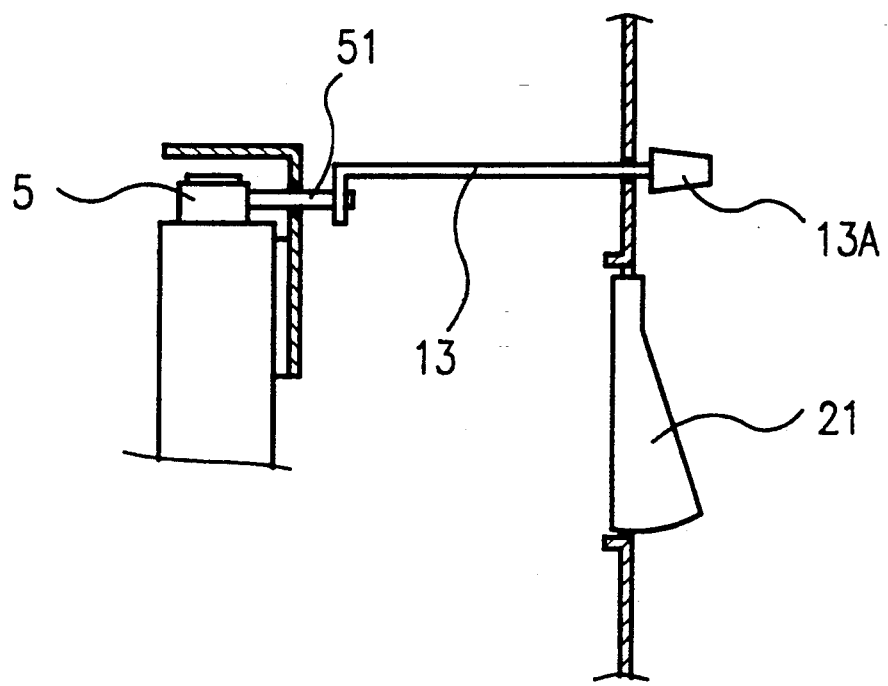
FIG. 1 is a schematic side view of a control device for adjusting the flame size according to a prior art.
Figure 2:
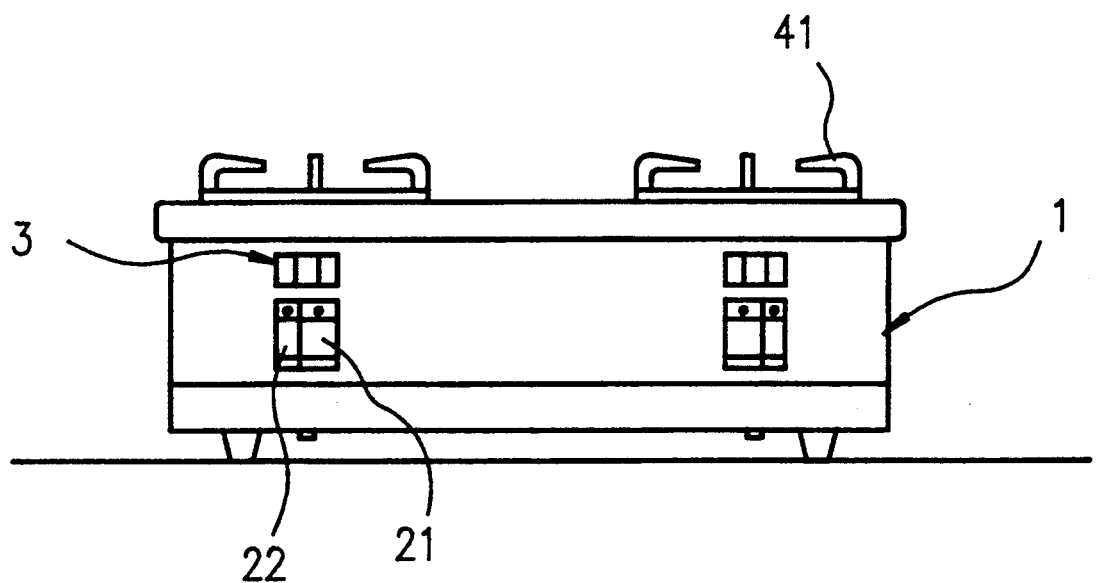
FIG. 2 is a front view of a gas range adapting a control device for adjusting the flame size embodying the present invention.

FIG. 2 illustrates a gas range in accordance with the preferred embodiment of the present invention. The gas range comprises a body 1 having a pair of main burners 41 on both sides of the body. Along the front wall of the body 1 below each respective gas burner 41 a flame size member 3 is mounted which comprises three control elements in the form of buttons; the is, for low, medium and high flame sizes. Below the flame size control member 3 an ignition button 21 and an extinguishing button 22 are mounted side by side.

Figure 3A:
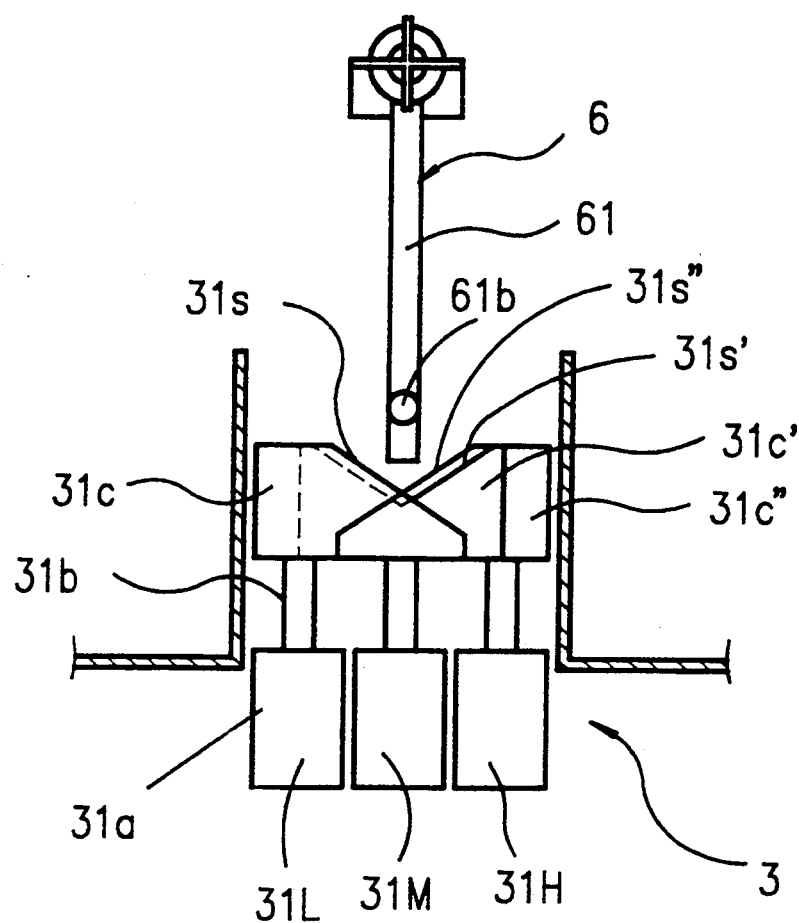
FIG. 3A is a schematic plan view of a control device for adjusting the flame size embodying the present invention.
Figure 3B:
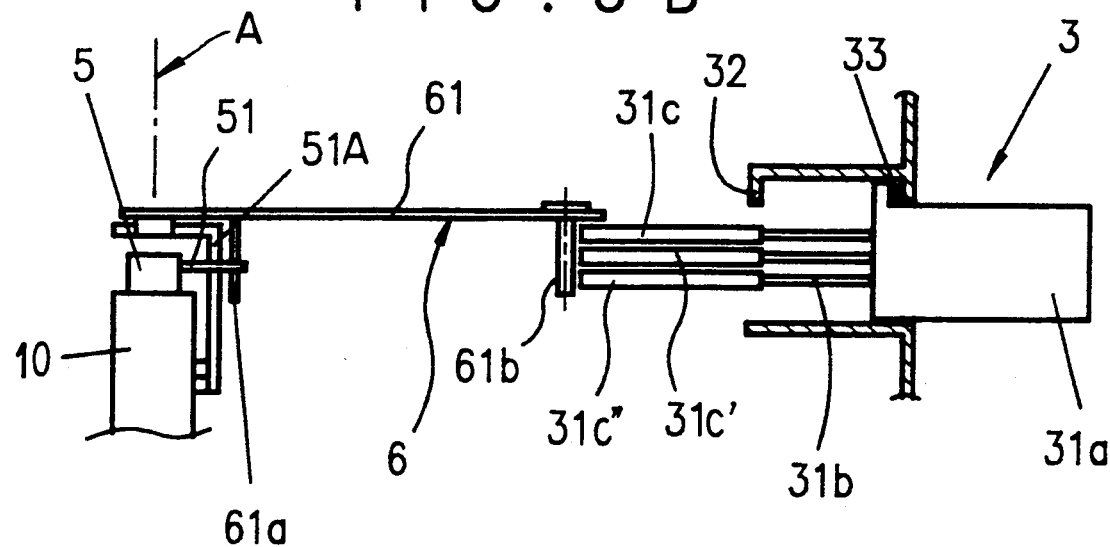
FIG. 3B is a side view of a control device for adjusting the flame size embodying the present invention.

In or lever FIGS. 3A, 3B and 3C, a needle valve member pin 51 is connected to a needle 5 which is located in gas passage 10. As the needle 5 is moved up, along a vertical axis A the gas flow area of the gas passage 10 widens in order to allow an increased volume of gas to flow to the respective burner. In contrast, as the needle 5 is moved down, the gas flow area of the gas passage 10 narrows so that the volume of supplying gas is decreased. At the exterior of the gas passage 10, a support plate 51A is attached such that the longitudinal direction of the plate 51A is parallel with the axis of the needle 5. A slot 51B is formed in the plate 51A with a predetermined slope relative to vertical (see FIG. 3C). The needle pin 51 is inserted into the slot 51B.

The needle 5 and pin 51 are rotatable together about a vertical axis. As the needle pin 51 is turned to the left about that axis in FIG. 3C, the needle pin 51 is moved upwards along the slot 51B because the left end of the slot 51B extends upwards, and, as a result, the needle 5 is also moved upwards. To the contrary, as the needle pin 51 is turned to the right in FIG. 3C the needle pin 51 is moved downwards along the slot 51B because the right end of the slot 51B extends downwards.

This system 5, 51, 51B, is well known prior art for controlling the flame size in a gas range. The main burner 41, the ignition button 21 and the extinguishing button 22 shown in FIG. 2 are also the same as the prior art. The description of the above components will be omitted in the following.

In FIG. 3A, the flame size control member 3 comprises a "low" flame size button 31L, a "medium" flame size button 31M and a "high" flame size button 31H. Respective buttons comprise a control plate 31c, 31c' and 31c", each with a unique configuration, a connecting bar 31b and a button body 31a. The buttons 31L, 31M, 31H are movable along respective horizontal axes which are mutually parallel and oriented perpendicular to the axis A. A lever 6 is mounted to the support plate 51A for rotation about the axis A. When the button body 31a corresponding to the determined flame size is pushed, a lever pin 61b which is mounted at the farthest end of the lever 6 from the needle 5 is turned in either a clockwise or a counterclockwise direction (when viewed in FIG. 3A) by means of a cam surface 31s, 31s' and 31s", formed respectively at the control plate 31c, 31c' and 31c".

According to the movement of the lever 6 a plate 61a is likewise moved because the plate 61a is integrally attached to the lever 6 (FIG. 3B). The movement of the plate 61a causes the needle pin 51 to be moved. Therefore, the needle pin 51 moves up or down along the slot 51B, thereby controlling the size of the opening around the needle 5 ( FIG. 3C ).

In FIGS. 4, 5 and 6, the operation of the flame size control device is illustrated.

Figure 4A:
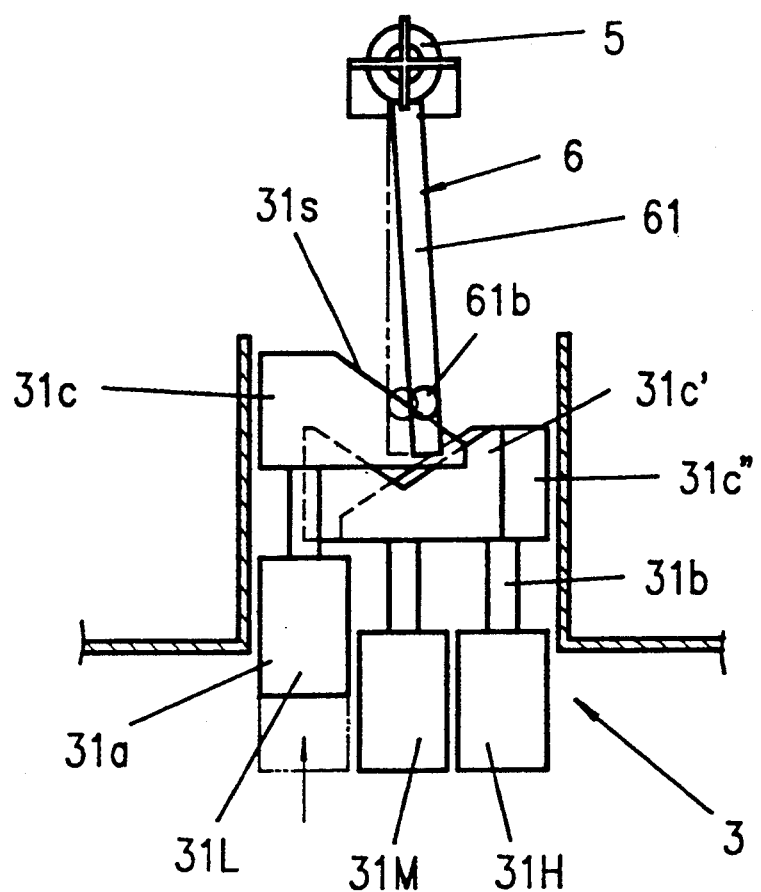
FIG. 4A is a plan view of a control device for adjusting the flame size into a low flame size, utilizing the embodiment of the present invention.
Figure 4B:
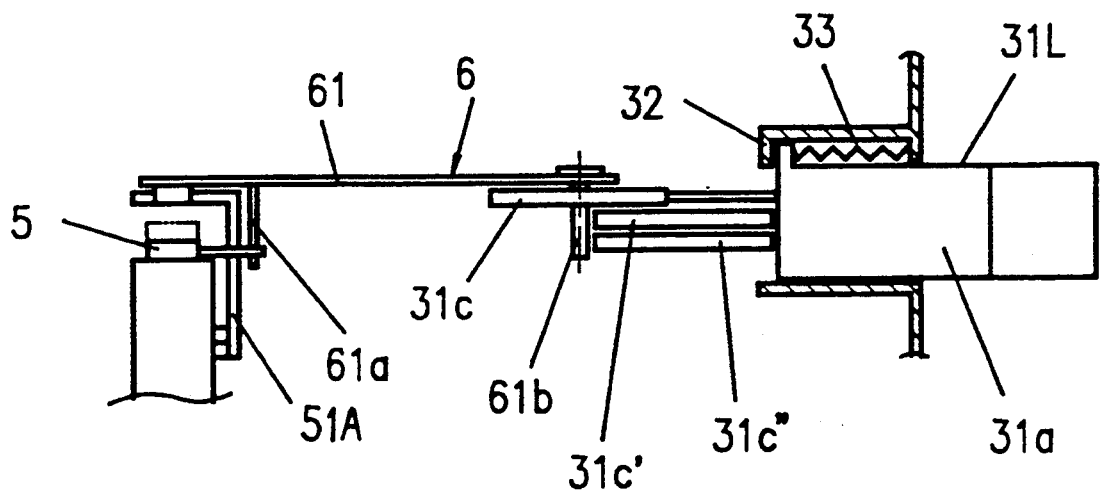
FIG. 4B is a side view of a control device for adjusting the flame size into a low flame size, utilizing the embodiment of the present invention.

FIGS. 4A and 4B illustrate the operation of a "low" flame size button 31L ( hereafter defined as the first step ). The control plate 31c of the first step has a sloping cam surfaces 31s which is cut away from the upper left end to the lower right end. When the button 31L of the first step is pushed, the control plate 31c is moved forward so that it comes into contact with the lever pin 61b.

The lever pin 61b is slid down on the sloping cam surface 31s so that the lever 6 is turned in a counter-clockwise direction. The plate 61a, moving in a coupled movement with the lever 6, causes the needle pin 51 to move down along the slope 51B. The needle 5 opens the gas passage to a minimal opening size so as to allow a predetermined volume of gas to pass.

Figure 5A:
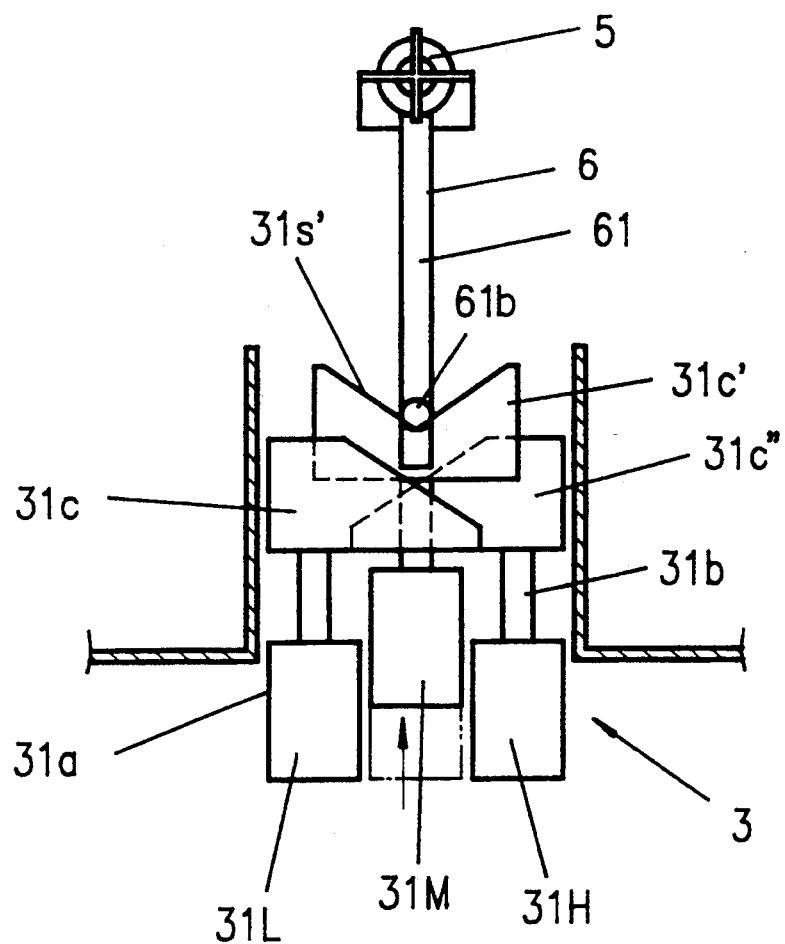
FIG. 5A is a plan view of a control device for adjusting the flame to a medium flame size, utilizing the embodiment of the present invention.
Figure 5B:
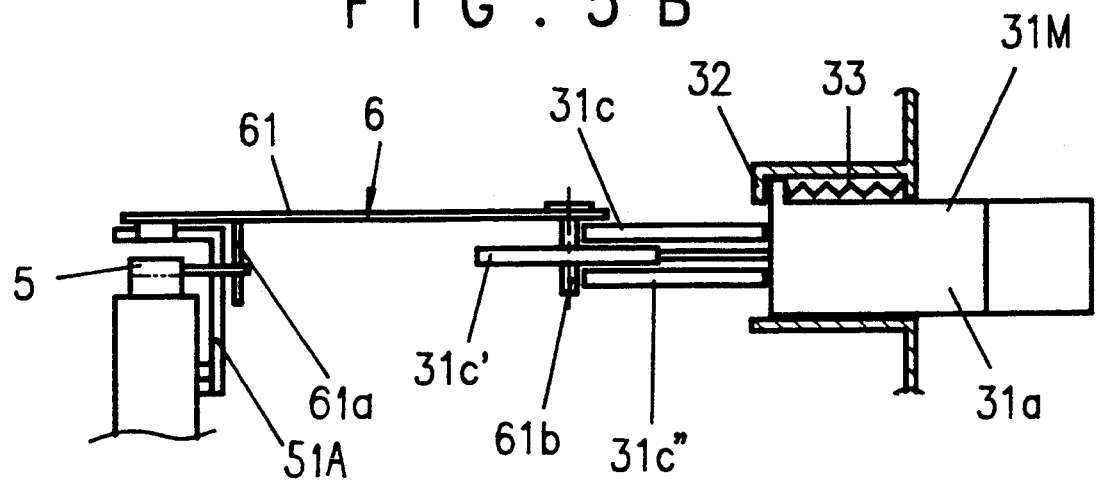
FIG. 5B is a side view of a control device for adjusting the flame to a medium flame size, utilizing the embodiment of the present invention.

FIGS. 5A and 5B illustrate the operation of a "medium" flame size button 31M ( hereafter defined as the second step ). The control plate 31c' of the second step has a sloping cam surfaces 31s' which converge toward the middle central portion. When the button 31M of the second step is pushed, the control plate 31c' is moved forward so that it comes into contact with the lever pin 61b.

The lever pin 61b moves toward the bottom of the valley of the cam surfaces 31s' and then the lever 6 returns to the neutral position which is parallel to the push direction of the button. At the same time, the plate 61a is moved to the same neutral position as that of lever 6 and the height of the needle 5 is set at a "medium" height. The needle 5 opens the gas passage to a medium opening size so as to allow a predetermined volume of gas to pass.

Figure 6A:
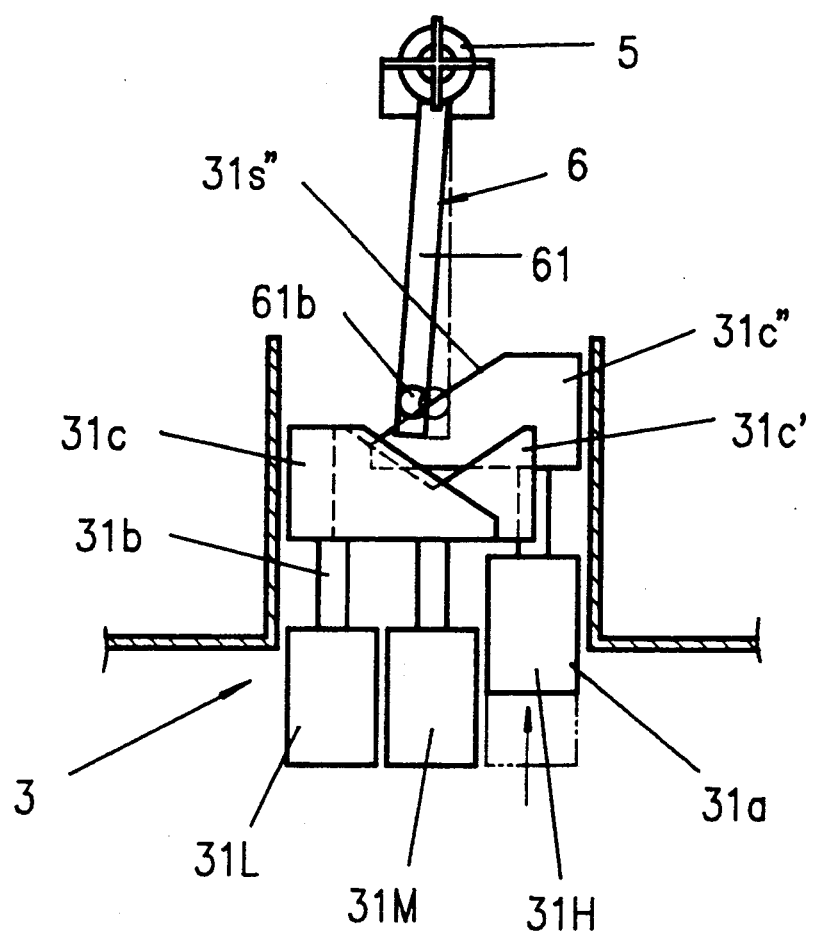
FIG. 6A is a plan view of a control device for adjusting a flame to high flame size, utilizing the embodiment of the present invention.
Figure 6B:
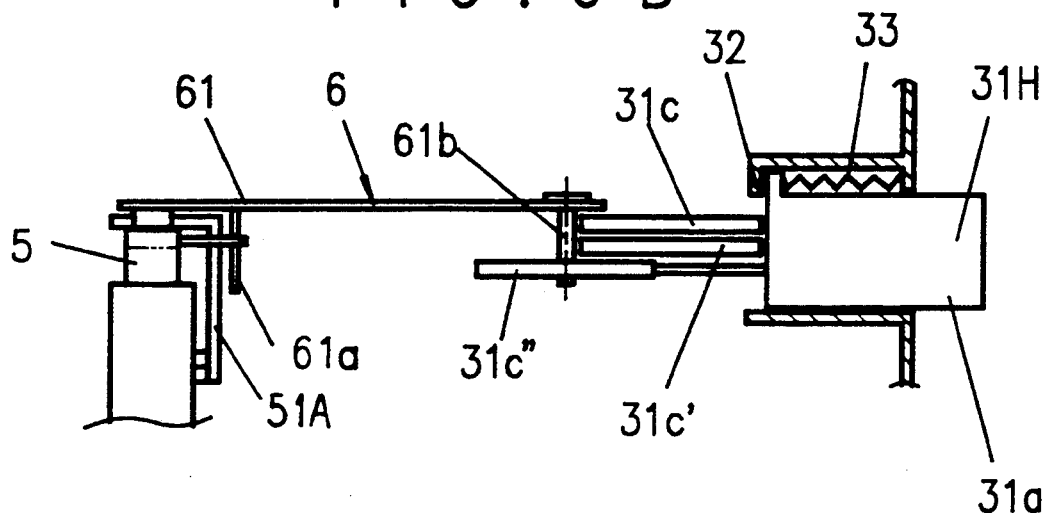
FIG. 6B is a side view of a control device for adjusting a flame to a high flame size, utilizing the embodiment of the present invention.

FIGS. 6A and 6B illustrate the operation of a "high" flame size button 31H ( hereafter defined as the third step ). When the control plate 31c" is pushed, the control plate 31c" is moved forward and the lever pin 61b is moved down on the sloping cam surfaces 31s", the higher slope of which is located at the upper left end and the lower slope at the lower right end. The lever 6 is turned in a clockwise direction and the needle pin 51 moves up along the slot 51B. The needle 5 opens the gas passage to a maximum opening size so as to allow a predetermined volume of gas to pass.

Numeral 33 is a spring which returns the button body back to the original position once the appliance user removes the pressure applied to the button body. In the above described structural size control device, a spring is employed, but not necessarily as in the manner described above. Another type of spring can be employed, for example, one such that the pushed button body is not retracted until an other button body is pushed.

The above control device for adjusting the flame size is convenient to the user because the direction of the button for controlling the flame size is in the same direction as the button for igniting/extinguishing the flame.

What is claimed:

1. In a gas flame burner having a gas passage, a vertically movable valve member movable to different positions for varying the gas supply in order to adjust the flame size, and an actuating mechanism for moving said valve member, said actuating mechanism comprising a plurality of selectively actuable control elements arranged to move said valve member to different vertical positions, respectively, so that the gas supply can be varied in order to adjust flame size is dependent upon which control element is actuated, said control elements being movable relative to one another in horizontal directions for vertically moving said valve member to one of said vertical positions.

2. Apparatus according to claim 1, wherein said control elements are displaceable in horizontal directions toward and away from said valve member for vertically moving said valve member.

3. Apparatus according to claim 2, wherein said actuating mechanism comprises a horizontal lever connected to said valve member, said lever and valve member being vertically and rotatably movable together about a vertical axis, a plate having therein a slot inclined relative to vertical, said lever extending through and slidably movable in said slot, each of said control elements including a cam surface engaging a portion of said lever for horizontally displacing said portion of said lever and causing said lever to rotate about said vertical axis.

4. Apparatus according to claim 3, wherein said portion of said lever comprises a vertically extending pin.

5. Apparatus according to claim 3, wherein said cam surface of one of said control elements is oriented to cause said lever to be rotated in one direction in response to said horizontal movement of said one control element for raising said valve member, and said cam surface of another of said control elements is oriented to cause said lever to be rotated in another direction in response to said horizontal movement of said other control element for lowering said valve member.

6. Apparatus according to claim 5 including a further control element having first and second cam surfaces oriented for causing said first lever to be raised and lowered, respectively, to a neutral position.

7. Apparatus according to claim 6, wherein said control elements comprise buttons.

8. In a gas flame burner having a gas passage, a movable valve member movable along a first axis to different positions for varying the gas supply in order to adjust the flame size, and an actuating mechanism for moving said valve member, said actuating mechanism comprising a plurality of selectively actuable control elements arranged to move said valve member to different positions, respectively, so that the gas supply can be varied in order to adjust flame size is dependent upon which control element is actuated, said control elements being movable relative to one another along parallel axes oriented perpendicular to said first axis for moving said valve member along said first axis to one of said vertical portion.

9. Apparatus according to claim 8, wherein said actuating mechanism comprises a lever connected to said valve member and being rotatable about an axis of rotation oriented parallel to said first axis, means interconnecting said lever and said valve member for moving said valve member along said first axis in response to rotation of said lever about said axis of rotation, each of said control elements including a cam surface engageable with a portion of said lever for rotating said lever about said axis of rotation.

10. Apparatus according to claim 9, wherein said first axis is vertical, and said parallel axes along which said control elements travel being horizontal.

* * * * *